Figure 1:
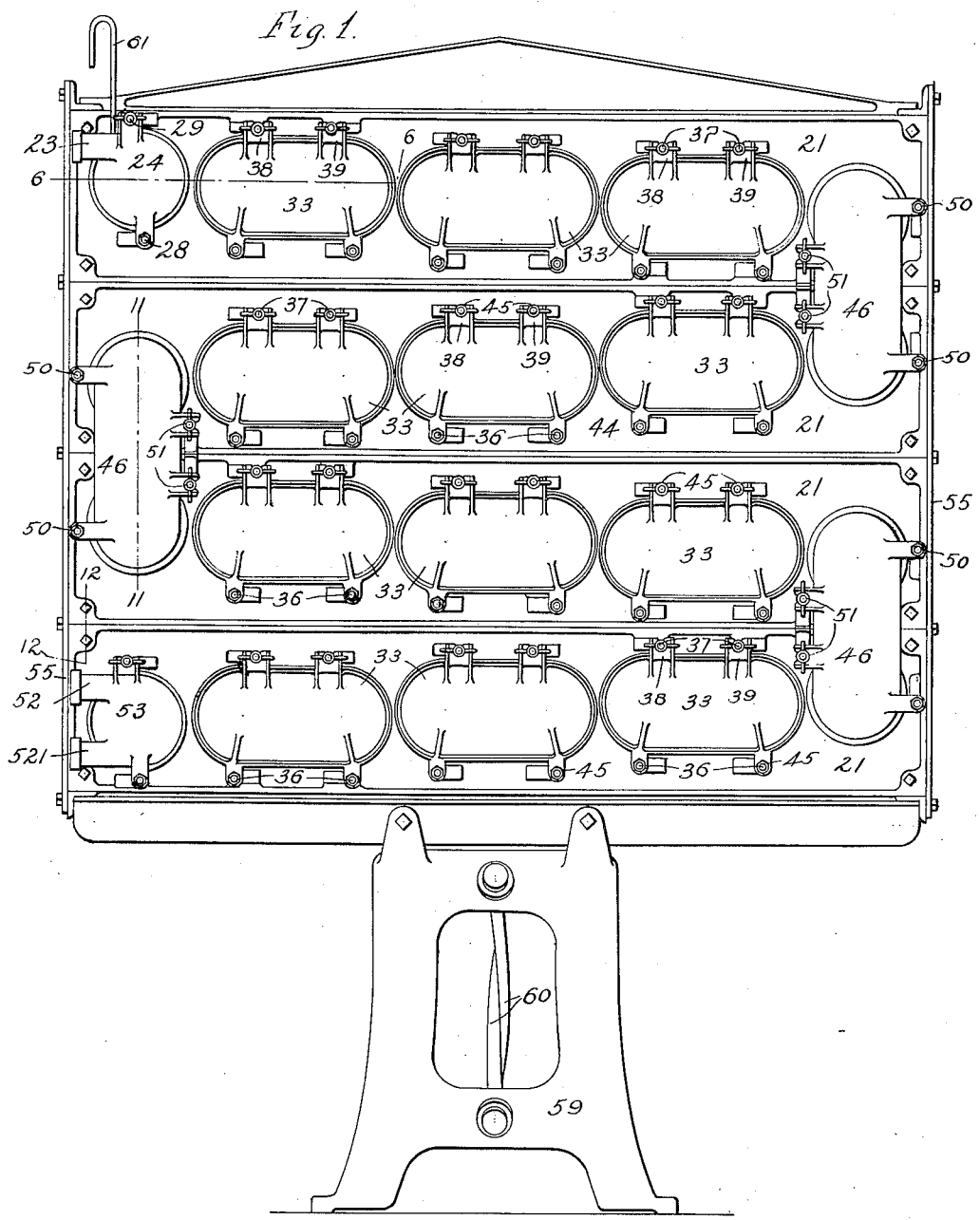

H. FELDMEIER.
CONTINUOUS FLOW RECEPTACLE FOR PASTEURIZING APPARATUS.
APPLICATION FILED SEPT. 18, 1912.

1,199,000.

Patented Sept. 19, 1916.
4 SHEETS—SHEET 1.

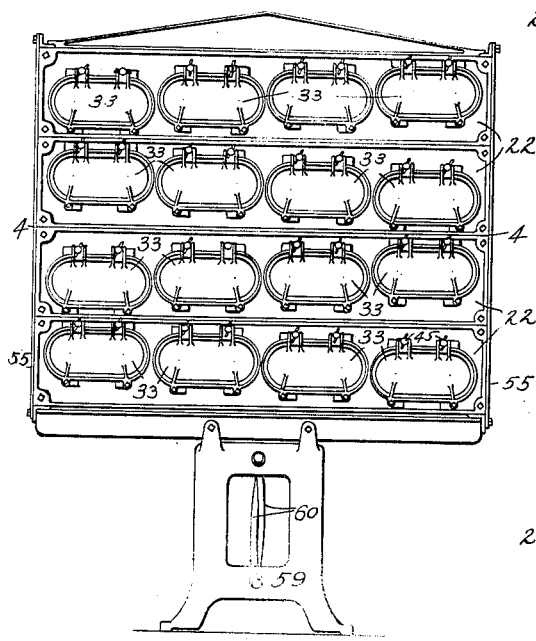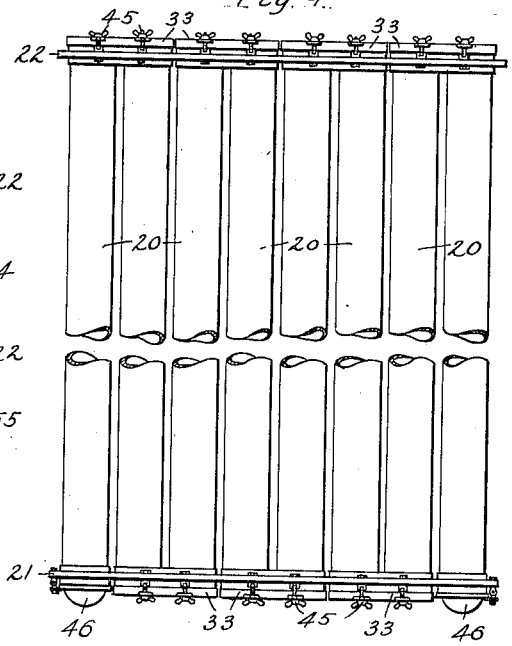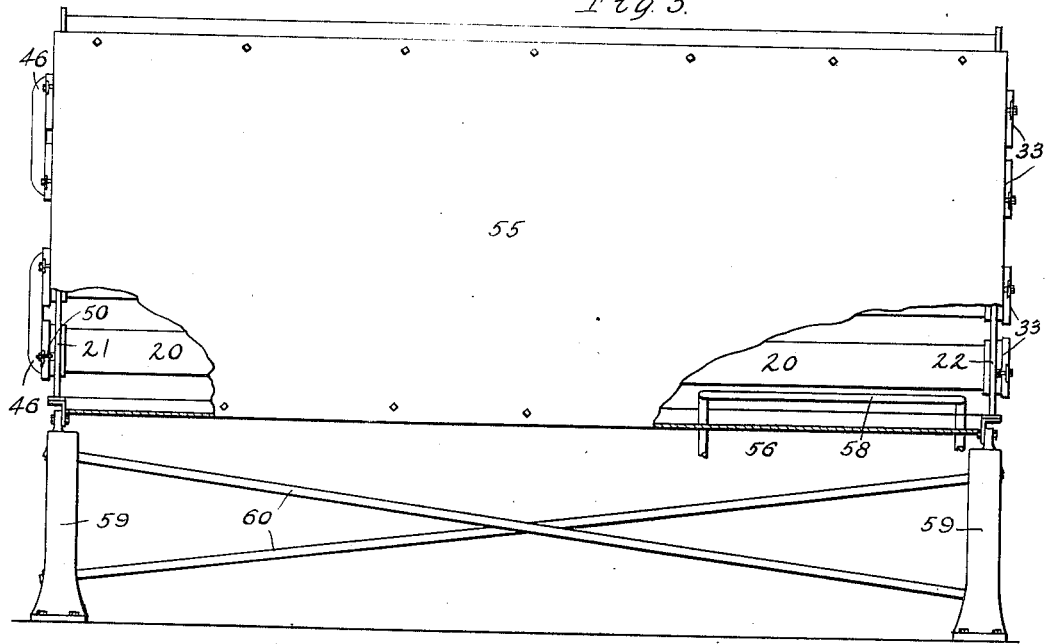

H. FELDMEIER.
CONTINUOUS FLOW RECEPTACLE FOR PASTEURIZING APPARATUS.
APPLICATION FILED SEPT. 18, 1912.
1,199,000.
Patented Sept. 19, 1916.
4 SHEETS—SHEET 3.
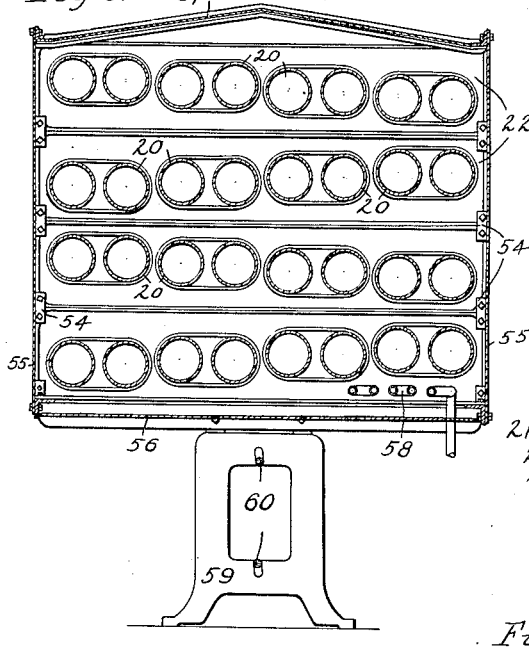
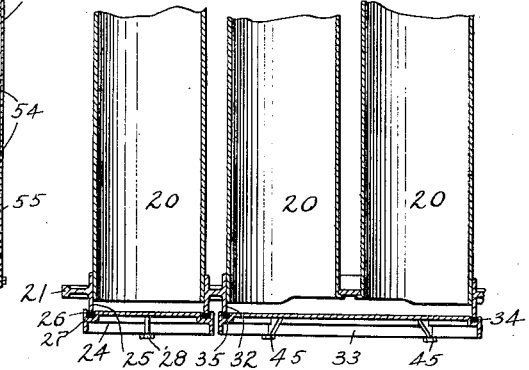
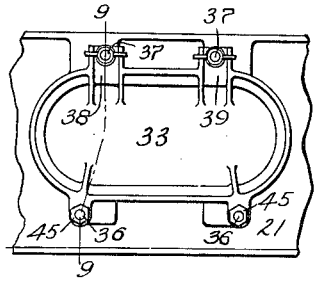
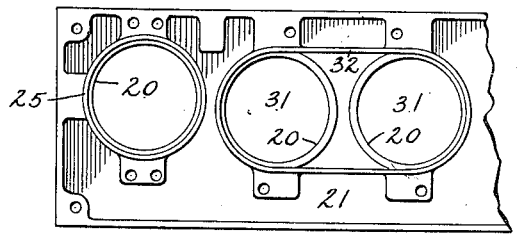
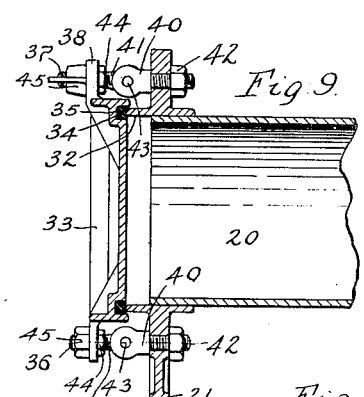
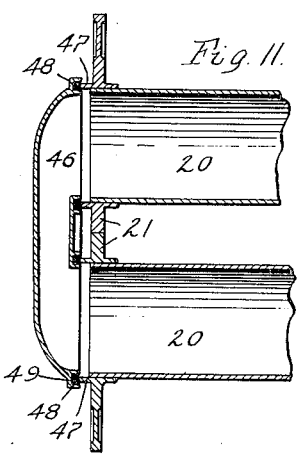
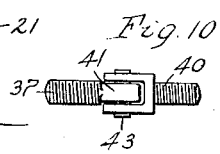
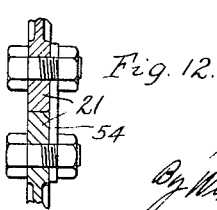

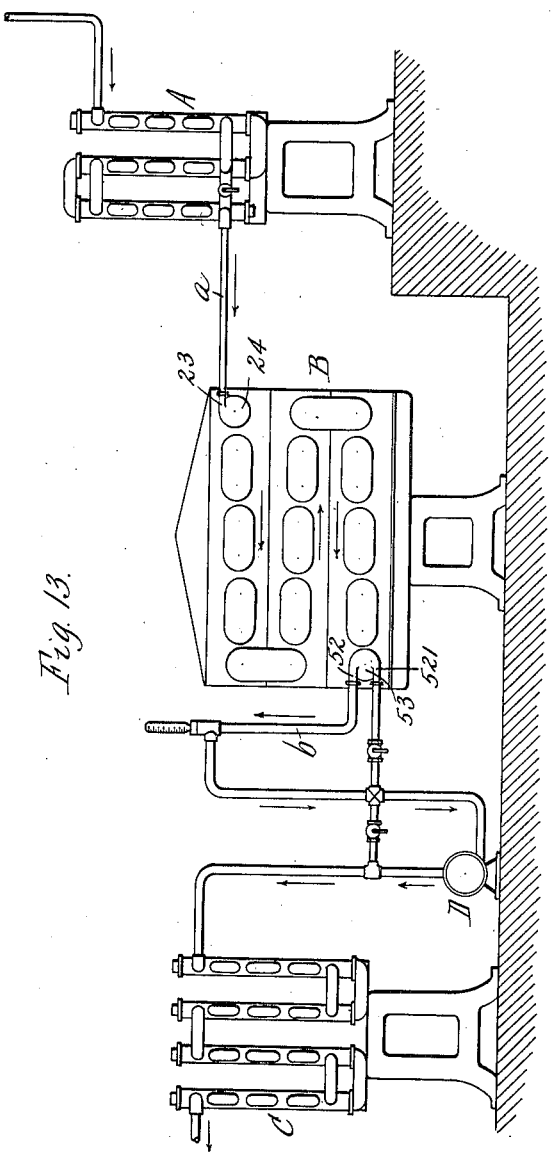

UNITED STATES PATENT OFFICE.

HARVEY FELDMEIER, OF LITTLE FALLS, NEW YORK, ASSIGNOR TO D. H. BURRELL & COMPANY, OF LITTLE FALLS, NEW YORK.

CONTINUOUS-FLOW RECEPTACLE FOR PASTEURIZING APPARATUS.

1,199,000. Specification of Letters Patent. Patented Sept. 19, 1916.

Application filed September 18, 1912. Serial No. 721,062.

*To all whom it may concern:*

Be it known that I, HARVEY FELDMEIER, a citizen of the United States, residing at Little Falls, in the county of Herkimer and State of New York, have invented a new and useful Improvement in Continuous-Flow Receptacles for Pasteurizing Apparatus, of which the following is a specification.

This invention relates to an improvement in that part of a pasteurizing apparatus for milk or other liquid which consists of a tubular receptacle or flow coil through which the milk flows after it has been heated and before it passes to the cooler, and which is made of such length that the milk in flowing through the apparatus occupies the period of time which is necessary for enabling the heat to produce the desired effect upon the milk. In order to produce low bacterial counts in the milk it is necessary that the temperature of the milk in flowing through the apparatus should be kept as nearly uniform as possible.

One object of this invention is to secure this desirable uniformity of temperature and this is produced by inclosing the flow pipes in a casing or air jacket which may be provided with a small heating coil, if necessary, for compensating for any small loss of heat.

Other objects of the invention are to construct the apparatus of like sections so that any desired number of them can be readily assembled to produce a pasteurizer of the required size, length of flow or capacity, and to render the apparatus more convenient and efficient in other respects.

In the accompanying drawings: Figure 1 is a front elevation of this improved apparatus. Fig. 2 is a rear elevation thereof, on a reduced scale. Fig. 3 is a side elevation with parts of the case or jacket broken away. Fig. 4 is a plan view of one of the component sections of the apparatus. Fig. 5 is a vertical cross section of the apparatus. Fig. 6 is a fragmentary horizontal section on line 6—6, Fig. 1, on an enlarged scale. Fig. 7 is a fragmentary front elevation of one of the headers. Fig. 8 is a front elevation of one of the covers connecting a pair of tubes. Fig. 9 is a vertical section on line 9—9, Fig. 8, on an enlarged scale, the fastening devices and cover lugs being shown in elevation. Fig. 10 is a detail view of one of the hinged fastening bolts. Fig. 11 is a vertical section of one of the upright return bends on line 11—11, Fig. 1, on an enlarged scale. Fig. 12 is a vertical section of the means for securing two headers together on line 12—12, Fig. 1, on an enlarged scale. Fig. 13 is a diagrammatic elevation of a pasteurizer system in which this tubular flow device is used.

Like reference characters refer to like parts in the several figures.

20 represents the flow tubes of the receptacle which extend lengthwise between the front headers 21 and the rear headers 22 and which are preferably arranged with a slight lengthwise pitch or inclination to improve the drainage. Each header is provided with one transverse row of openings for the reception of flow tubes, which latter are tightly secured in these openings by flanging and soldering or in any other suitable manner. The openings are arranged in each header successively at a slightly lower level from the inlet to the outlet of the header to correspond with the inclination of the tubes.

The apparatus shown in Figs. 1, 2, 3 and 5 of the drawings consists of four sections arranged one above the other, while the apparatus shown in Fig. 13 consists of three sections. The hot milk enters the uppermost section at the left hand corner thereof through a nipple 23 which is formed on a circular cover 24. The latter is secured to the front side of the front header 21 so as to cover the front end of the corresponding flow tube 20, Fig. 6. The header is provided with a forwardly projecting circular flange 25 which surrounds the opening in which the tube is secured and the cover is provided opposite said flange with a circular recess 26 containing a packing 27 which bears against the flange and forms a tight joint between the cover and the header. The flange forms at the end of the tube a chamber from which the milk flows into the tube. The cover 24 is secured to the header by a lower hinge bolt 28 and an upper bolt 29, so that upon releasing the upper bolt the cover can be swung to a horizontal position on the lower bolt for exposing the tube.

The ends of every pair of communicating tubes 20 are tightly secured in two adjoining openings 31, Fig. 7, which are inclosed by a forwardly projecting flange 32 forming a chamber by which the ends of the tubes communicate. This chamber is closed at the front by a transverse cover 33 which is provided with an endless groove or recess 34 in which a packing 35 is arranged. This means of connecting adjoining tubes is employed both on the front and rear headers. Each of these transverse covers is preferably secured to the header by two lower hinge bolts 36 and two upper bolts 37 passing, respectively, through bifurcated lugs 38 39. Each of these hinge bolts consists of an inner fixed part 40 and an outer movable part 41, Figs. 9 and 10. The fixed part is secured to the header by a nut 42 and is provided with a bifurcated outer end to which the outer part 41 is pivoted by a pin 43. The outer part is secured to the cover by nuts 44 on the rear side of the cover and nuts 45 on the front side. The nuts 45 applied to the upper bolts are preferably winged nuts, which permit the upper bolts to be readily released. When this has been done the cover can be swung down on the lower bolts to a horizontal position, thereby exposing the ends of the tubes for cleaning.

46 represents vertical return bends which are applied to the front headers for placing the end tube of one header in communication with the end tube of another header next above or below. The header is provided around each of these end tubes with a circular flange 47, and the return bend is provided around each of its two openings with a circular recess 48 containing a packing 49 which bears against the flange 47. The return bend is attached to the two headers by outer hinge bolts 50 and inner hinge bolts 51, like those which are used in connection with the covers, as described.

The milk enters, as stated, at the upper left hand corner through the nipple 23, flows back and forth through the tubes of the uppermost section of the apparatus, passes down to the next lower section through the return bend connecting these sections at the right hand side, flows through the tubes of this lower section and then passes through the tubes of all the following sections until it reaches the outlet nipple 52 formed on the cover 53, Figs. 1 and 13. It is obvious that the number of the sections can be increased or reduced as may be necessary to produce the desired length of flow or capacity of the apparatus.

The outlet nipple 52 is arranged at the highest point of the cover 53 of the lowermost or outlet tube in order that the air which is confined in the tubes may escape from the same in filling the apparatus. As the milk enters the upper tubes in filling the apparatus from the top, the upper tubes will sometimes fill faster than the lower tubes, due to the frictional resistance which the milk encounters. The milk piles up, so to speak, in the upper tubes while the lower tubes are but partially filled. The air which is thus trapped in the lower tubes escapes through the elevated outlet 52 of the last lower tube. The cover 53 of the last lower tube is further provided with a bottom outlet 521 which serves as a drain for emptying the apparatus or coil when desired.

Each front header is provided with a certain number of pairs of openings for flow tubes, each pair being connected by a transverse cover, and with two single end openings, each of which can be used either for connection with an outlet or inlet cover or for connection by a return bend with the single end opening of the header next above or below.

The superposed headers are secured together by any suitable means, for instance, upright bars 54, Fig. 12, and form the solid end walls of the structure. Between the headers the sides of the structure are inclosed by metallic plates or sheets 55, the bottom by a plate or sheet 56, and top by a plate or sheet 57, thus inclosing the space between the headers through which the flow tubes extend in an air chamber and preventing or greatly reducing loss of heat by radiation. If necessary, this inclosed air space may be provided with a small heating coil 58, Fig. 3, for compensating for any slight loss of heat which may take place. The structure is supported by any suitable means, for instance, by end frames 59 arranged underneath the headers and connected by stay rods 60.

61 represents a vent pipe connected with the milk inlet.

The flanges on the header are preferably arranged on both sides of the web in order to render the headers reversible and avoid the necessity of constructing right and left headers. The rear headers are not provided with single end openings but only with openings arranged in pairs because no vertical connections are required in the rear headers.

In Fig. 13, which represents a complete pasteurizing apparatus, A represents the milk heater, B the continuous-flow receptacle or tubular coil through which the milk flows while retaining its heat, and C the cooler. The milk passes from the heater through the pipe $a$ to the inlet nipple 23 of the cover 24 of the uppermost or inlet tube and escapes from the outlet nipple 52 of the last lower tube upwardly through a stand pipe $b$ which extends above the highest tier of tubes and whereby the receptacle is kept full. D represents the milk pump.

I claim as my invention:

1. A tubular pasteurizer comprising front and rear headers having openings for flow tubes, flow tubes connecting said headers and secured in said openings, means mounted on the outer sides of said headers for connecting adjoining tubes, there being on each header a plurality of said connecting means each of which forms a passage connecting the adjacent ends of two tubes and which are independently movable to afford access to the tubes connected thereby, liquid inlet and outlet connections connecting with the flow tubes independently of said connecting means, and means for inclosing the flow tubes to reduce loss of heat by radiation.

2. A tubular pasteurizer comprising front and rear headers having openings for flow tubes, a plurality of pairs of flow tubes extending from one to the other of said headers and secured in said openings, means for supporting said headers, and a plurality of movable covers secured to the outer side of each header and each cover covering a pair of adjoining openings and tubes and being movable independently of the other covers.

3. In a tubular pasteurizer, the combination of superposed sections, each composed of headers and connecting flow tubes, the headers being each provided with pairs of openings in which said flow tubes are secured, means for supporting said headers, a plurality of independently movable covers secured to the outer side of each of said headers and each covering a pair of said openings, one of said headers being also provided with single end openings, and removable return bends secured to the outer sides of said headers and connecting the end opening of one header with the corresponding end opening of the next header.

4. A tubular pasteurizer comprising front and rear headers having openings for flow tubes, flow tubes connecting said headers and secured in said openings, means mounted on the outer sides of said headers for connecting adjoining tubes, there being on each header a plurality of said connecting means each of which forms a passage connecting the adjacent ends of two tubes and which are independently movable to afford access to the tubes connected thereby, liquid inlet and outlet connections connecting with the flow tubes independently of said connecting means, a casing connecting said headers and forming therewith a chamber inclosing said tubes, and means for heating said chamber.

5. In a tubular pasteurizer, the combination of a plurality of similar sections each composed of headers and a plurality of pairs of flow tubes extending from one to the other of said headers, the headers being provided with openings in which the ends of the tubes are secured, a plurality of movable covers secured to the outer side of each header and each cover covering a pair of openings and joining the tubes therein and being movable independently of the other covers to afford access to the tubes, means connecting the flow tubes of adjoining sections, and connecting means for said sections.

6. A tubular pasteurizer comprising headers having pairs of openings for flow tubes, and flanges arranged on the outer side of each header one around each pair of openings, flow tubes connecting said headers and secured in said openings, a plurality of independently movable covers each fitted against one of said flanges and each covering a pair of said openings and tubes, and means for supporting said headers.

7. A tubular pasteurizer having the outlet for the milk arranged at the top of the outlet tube, thereby providing an exit for the air from the tubes, substantially as set forth.

8. A tubular pasteurizer having its outlet tube provided with an outlet for the milk arranged at the top of said tube and with a drain passage arranged at the bottom of said tube, substantially as set forth.

9. A tubular pasteurizer having its outlet for the milk arranged at the top of the outlet tube and connected with an ascending outlet pipe which extends above the level of the inlet tube, substantially as set forth.

10. A tubular pasteurizer comprising superposed sections, each composed of headers and connecting flow tubes inclined back and forth, the whole forming a continuous inclined flow passage, the headers being each provided with pairs of openings in which the flow tubes are secured and means which connect the openings in pairs and are movable to afford access to the tubes.

Witness my hand in the presence of two subscribing witnesses.

HARVEY FELDMEIER.

Witnesses:
JESSIE E. MERCHANT,
CLARENCE E. MELLOR, Jr.